P. J. SUMMERS.
WEIGHING STAND FOR COTTON PICKERS.
APPLICATION FILED FEB. 24, 1917. RENEWED DEC. 30, 1918.
1,310,638.
Patented July 22, 1919.
2 SHEETS—SHEET 2.
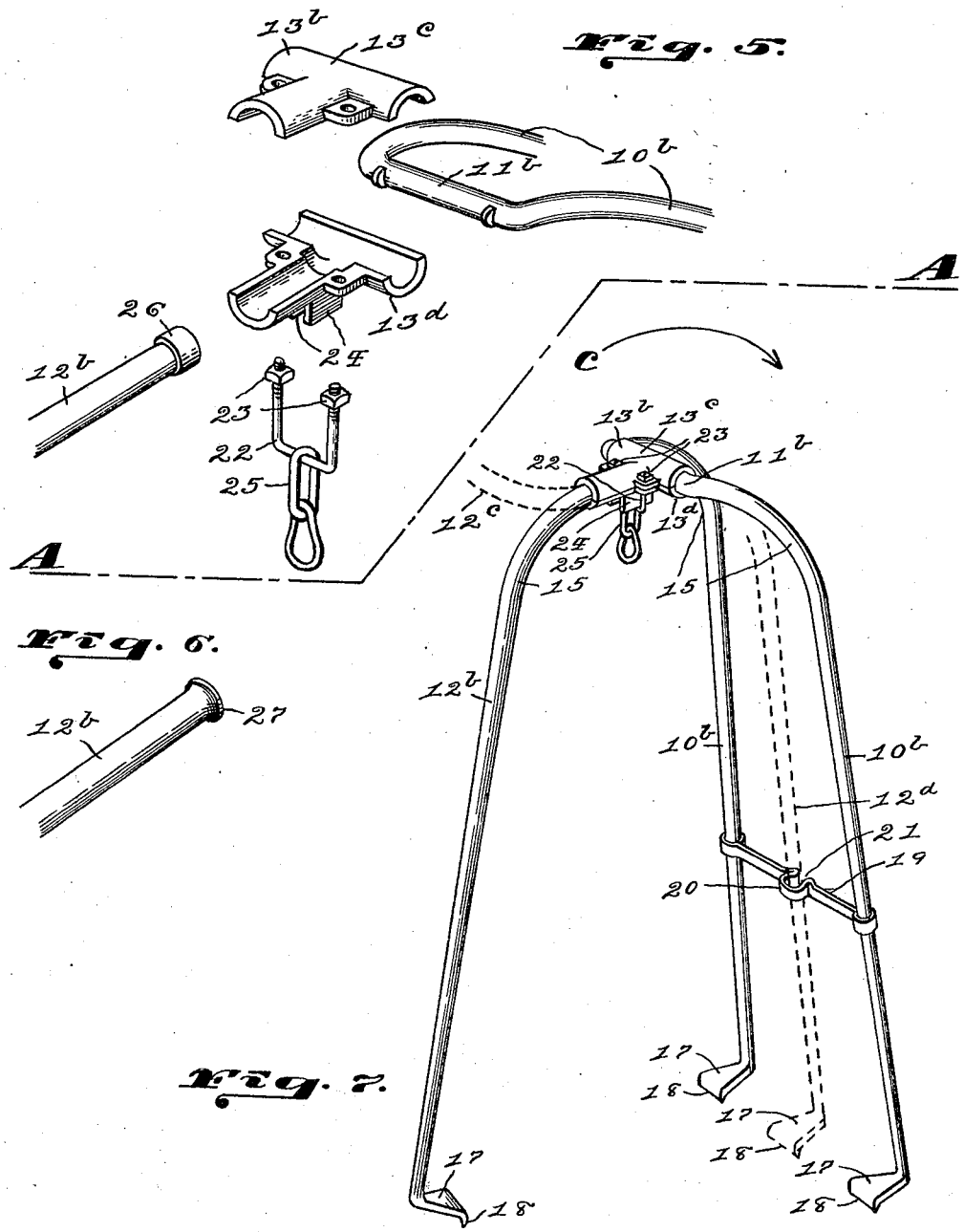
INVENTOR:
Paul J. Summers.
BY
Frank P. Shepard.
ATTORNEY.

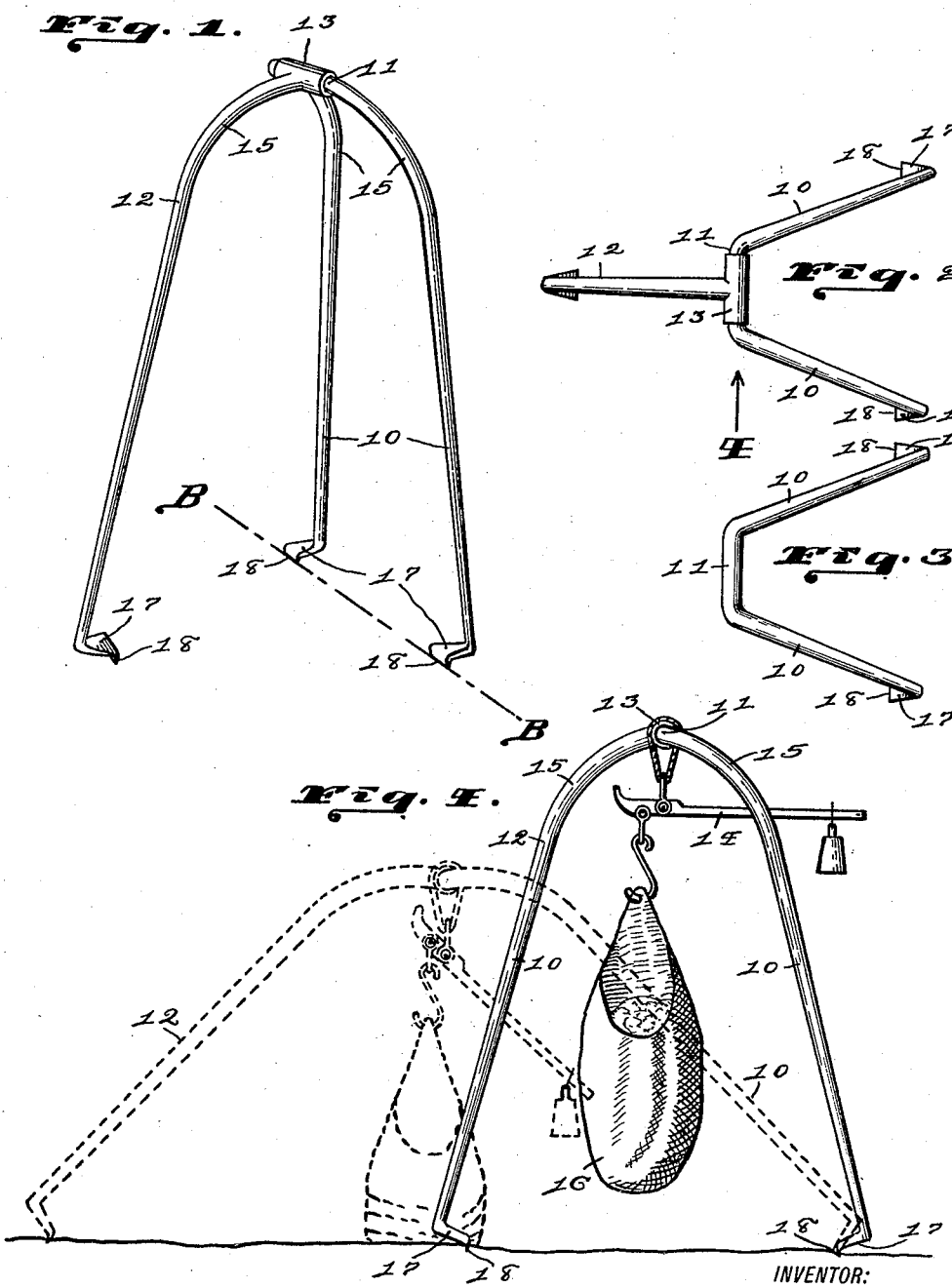

UNITED STATES PATENT OFFICE.

PAUL J. SUMMERS, OF MANGUM, OKLAHOMA.

WEIGHING-STAND FOR COTTON-PICKERS.

1,310,638.  Specification of Letters Patent.  Patented July 22, 1919.

Application filed February 24, 1917, Serial No. 150,657. Renewed December 30, 1918. Serial No. 268,975.

*To all whom it may concern:*

Be it known that I, Paul J. Summers, a citizen of the United States, residing at Mangum, in the county of Greer and State of Oklahoma, have invented certain new and useful Improvements in Weighing-Stands for Cotton-Pickers, of which the following is a specification, reference being had to the accompanying drawings.

The invention pertains to portable weighing stands, such as are moved from place to place in the field and used for suspending steelyards or other weighing devices in weighing cotton.

Stands of this kind are usually in the form of a tripod, with the legs straight.

The stand must, therefore, be high enough so that the sack of cotton or other object suspended will clear the legs, and this arrangement of the stand makes it awkward to carry or haul about.

An object, therefore, of the invention is to provide a stand of reduced height which will clear the object suspended.

Another object is to so arrange the stand that it can be folded or nested in compact form.

Other objects and advantages of the invention will be set forth in the ensuing description.

Figure 1 of the accompanying drawings is a perspective view showing a simple form of the invention.

Fig. 2 is a plan view of the parts shown in Fig. 1.

Fig. 3 is a plan view of one of the parts shown in Fig. 1.

Fig. 4 is a side elevation taken in the direction of the arrow 4 of Fig. 2, and shows a steelyard and sack of cotton suspended from the stand.

Fig. 5, which includes all matter above the line A—A on the second sheet of drawings, is a perspective view showing parts of a more developed form of the stand in position for assemblage.

Fig. 6 is a similar view, but showing an optional construction of a certain part.

Fig. 7 is a perspective view of the complete stand.

Fig. 8 is a plan view of a cross-bar.

All the perspective views are in the same direction, and like characters of reference designate like parts in all the figures.

The simple stand shown in Figs. 1 to 4, inclusive, includes two diverging legs 10 which are connected integrally together at their upper ends by a horizontal portion 11 adapted to form a pivot-pin, and a third leg 12 whose integral tubular head 13 pivotally embraces said portion 11.

In order to clear the weighing device 14 or other suspended object without having to extend to too high an apex, the two legs 10 are curved inward at their upper ends, as at 15, around a common axis-line of curvature; and the third leg 12 is likewise curved inward as shown.

Using the line B—B of Fig. 1 as an axis-line of movement for the two legs 10, the lower end of the third leg 12 may be drawn outward along the surface of the ground to lower the apex of the stand to the position shown by the dotted lines in Fig. 4.

The object 16 to be weighed can then be hitched to the weighing device while resting on the ground, and then suspended by taking hold of the third leg 12 and raising the stand back up to the position shown by the full lines in Fig. 4.

The lower end of each leg is provided with a wide foot 17 to keep it from sinking into the ground, and each foot is provided with a toe 18 to keep it from slipping.

While the simple form of stand shown in Figs. 1 to 4 accomplishes some of the objects stated, the third leg 12 cannot be folded or nested with the other legs into a compact form for carrying or hauling.

In the more developed form of the stand shown in Figs. 5 to 8, the pivotal head $13^b$ of the third leg $12^b$, which pivotally embraces the pivot-pin portion $11^b$ of the two legs $10^b$, is itself pivoted to the upper end of said third leg on an axis-line at right angles to said pivot-pin portion.

With the parts arranged in this way, the third leg $12^b$ may be revolved 180 degrees in its pivotal head $13^b$ to the position indicated by the dotted representation $12^c$ in Fig. 7, and then swung over in the direction of the arrow C to the position shown by the dotted representation $12^d$ in said figure.

A cross-bar 19 of resilient strap metal forms a brace connection between the lower portions of the two legs $10^b$, and this brace is formed with a central loop 20, best shown in Fig. 8, which receives the third leg $12^b$ when the latter is in folded position.

The resiliency of the loop portion of the brace connection 19 allows the leg $12^b$ to be forced in or out of the loop 20 through the reduced entrance opening 21 of said loop.

With the third leg 12$^b$ folded in this way, its curvature and foot are disposed in the same direction as the curvature and feet of the other two legs 10$^b$, and will therefore nest perfectly with the latter.

For convenience in assemblage, the head 13$^b$ of the third leg 12$^b$ is made separable, the upper and lower halves 13$^c$ and 13$^d$, respectively, of it being held together by a U-shaped bolt 22 provided with nuts 23.

This bolt 22, in being screwed up tightly, bears up against two depending lugs 24 on the lower side of the lower half 13$^d$ of the pivotal head 13$^b$, these lugs being spaced apart so that the upper link 25 of a chain or other suspending means may engage said bolt.

The upper or pivotal end of the third leg 12$^b$ may have a cap 26 screwed onto it to hold it in the head 13$^b$; or said leg may be flared or up-set, as at 27 in Fig. 6, for the same purpose.

Having thus described the invention, I claim:—

1. In a device of the class described, a pair of divergent legs rigidly connected together at their upper ends, a third leg having its upper end pivoted to the upper end of said pair, a brace connecting the lower portions of the legs of said pair, and means on said brace for engaging the third leg.

2. In a device of the class described, a pair of legs integrally connected together at their upper ends by a portion adapted to form a pivot-pin, and a third leg having a head through which said portion pivotally extends, the third leg also being pivoted in its head on an axis-line at right angles to the axis-line of said pivot-pin portion, the upper ends of the three legs being curved inward.

3. In a device of the class described, a pair of divergent legs integrally connected together at their upper ends by a pivot-pin portion, a third leg having a head through which the pivot-pin portion is journaled, the three legs curving inward at their upper ends, the third leg being pivoted in its head on an axis-line at right angles to the axis-line of said pivot-pin portion whereby said third leg may be brought to position to nest with the legs of the pair, a brace connecting the lower ends of the legs of the pair, and means on said brace for holding the third leg in nested position.

4. In a device of the class described, a pair of legs connected together at their upper ends and spaced apart at their lower ends, a brace connection connecting the spaced lower ends of the legs, said brace connection being formed with a central elastic loop having an outlet opening, a third leg pivoted to the upper ends of the legs of the pair, said third leg being adapted to fold or nest with the legs of the pair, and being adapted to rest in the loop of the brace connection.

Witness my hand this 10th day of February, 1917.

PAUL J. SUMMERS.